(12) United States Patent
Zander et al.

(10) Patent No.: US 11,565,678 B2
(45) Date of Patent: Jan. 31, 2023

(54) HYDRAULIC BLOCK FOR A HYDRAULIC ASSEMBLY OF A SLIP CONTROL SYSTEM OF A HYDRAULIC VEHICLE BRAKE SYSTEM

(71) Applicant: Robert Bosch GmbH, Stuttgart (DE)

(72) Inventors: Thomas Zander, Oberstaufen (DE); Michael Loeffler, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 762 days.

(21) Appl. No.: 16/490,383

(22) PCT Filed: Feb. 1, 2018

(86) PCT No.: PCT/EP2018/052468
§ 371 (c)(1),
(2) Date: Aug. 30, 2019

(87) PCT Pub. No.: WO2018/162149
PCT Pub. Date: Sep. 13, 2018

(65) Prior Publication Data
US 2020/0070798 A1    Mar. 5, 2020

(30) Foreign Application Priority Data
Mar. 8, 2017   (DE) ..................... 10 2017 203 752.0

(51) Int. Cl.
*B60T 8/36* (2006.01)
*B60T 17/04* (2006.01)
*F15B 13/08* (2006.01)

(52) U.S. Cl.
CPC .............. *B60T 17/04* (2013.01); *B60T 8/368* (2013.01); *F15B 13/0814* (2013.01);
(Continued)

(58) Field of Classification Search
CPC ....... B60T 8/368; B60T 8/4018; B60T 8/4031
See application file for complete search history.

(56) References Cited

U.S. PATENT DOCUMENTS 5,439,279 A * 8/1995 Linkner, Jr. .......... B60T 8/3615
                                                   137/454.2
6,042,200 A * 3/2000 Hosoya ................... B60T 8/368
                                                   303/119.3
(Continued)

FOREIGN PATENT DOCUMENTS

CN         101205939 A     6/2008
CN         104837698 A     8/2015
(Continued)

OTHER PUBLICATIONS

International Search Report corresponding to PCT Application No. PCT/EP2018/052468, dated Apr. 18, 2018 German and English language document) (5 pages).

*Primary Examiner* — Bradley T King
(74) *Attorney, Agent, or Firm* — Maginot, Moore & Beck LLP

(57) ABSTRACT

A cuboid hydraulic block of a slip control system of a hydraulic vehicle brake system has a lateral face, an opposite lateral face, at least two long sides, a short side, and an opposite short side. All receptacles for solenoid valves of the slip control system are disposed in the lateral face of the hydraulic block. Receptacles for hydraulic accumulators of the slip control system and connecting bores for a master brake cylinder are disposed in the opposite lateral face of the hydraulic block. Receptacles for hydraulic pumps of the slip control system are disposed in the long sides of the hydraulic block. An electric motor for driving the hydraulic pumps is disposed on the short side of the hydraulic block. Connecting bores for wheel brakes are disposed in the opposite short side of the hydraulic block.

8 Claims, 3 Drawing Sheets

(52) U.S. Cl.
CPC ....... *F15B 13/0892* (2013.01); *B60T 2270/10* (2013.01); *F15B 2211/20515* (2013.01)

(56) References Cited

U.S. PATENT DOCUMENTS

| | | | | |
|---|---|---|---|---|
| 6,545,613 B1* | 4/2003 | Hornback | ................ | B60T 8/00 340/870.14 |
| 2007/0096553 A1* | 5/2007 | May | ................ | B60T 8/368 303/119.3 |
| 2007/0110590 A1* | 5/2007 | Pabst | ................ | B60T 8/4072 417/273 |
| 2008/0298982 A1* | 12/2008 | Pabst | ................ | B60T 8/368 417/273 |
| 2010/0202903 A1* | 8/2010 | Plewnia | ................ | B60T 8/368 417/273 |
| 2010/0231033 A1* | 9/2010 | Gastauer | ................ | B60T 8/368 303/10 |
| 2011/0074208 A1* | 3/2011 | Song | ................ | B60T 8/4031 303/10 |
| 2013/0319562 A1* | 12/2013 | Weh | ................ | F15B 13/0803 137/884 |
| 2016/0185329 A1* | 6/2016 | Lee | ................ | B60T 8/4081 303/10 |
| 2016/0280197 A1* | 9/2016 | Mayr | ................ | B60T 13/686 |
| 2018/0065609 A1* | 3/2018 | Leiber | ................ | B60T 8/368 |
| 2018/0065612 A1* | 3/2018 | Loeffler | ................ | B60T 8/52 |
| 2019/0210576 A1* | 7/2019 | Zander | ................ | B60T 17/04 |
| 2022/0161774 A1* | 5/2022 | Reuter | ................ | B60T 7/042 |

FOREIGN PATENT DOCUMENTS

| | | | | |
|---|---|---|---|---|
| DE | 102 37 163 A1 | | 2/2004 | |
| DE | 10 2006 059 924 A1 | | 6/2008 | |
| DE | 102009000580 A1 | * | 8/2010 | ............. B60T 8/368 |
| DE | 10 2013 209 727 A1 | | 11/2014 | |
| EP | 2 902 283 A1 | | 8/2015 | |
| WO | 2018/114090 A1 | | 6/2018 | |

* cited by examiner

HYDRAULIC BLOCK FOR A HYDRAULIC ASSEMBLY OF A SLIP CONTROL SYSTEM OF A HYDRAULIC VEHICLE BRAKE SYSTEM

This application is a 35 U.S.C. § 371 National Stage Application of PCT/EP2018/052468, filed on Feb. 1, 2018, which claims the benefit of priority to Serial No. DE 10 2017 203 752.0, filed on Mar. 8, 2017 in Germany, the disclosures of which are incorporated herein by reference in their entirety.

BACKGROUND

The disclosure relates to a cuboidal hydraulic block for a hydraulic assembly of a slip control system of a hydraulic vehicle brake system.

Slip control systems are for example anti-lock, traction control and/or driving dynamics control systems/electronic stability programs, for which the abbreviations ABS, ASR, FDR/ESP are conventional. Such slip control systems of hydraulic vehicle brake systems are known from passenger motor vehicles and motorcycles and will not be discussed in any more detail here.

The core part of such slip control systems is a hydraulic assembly which comprises a hydraulic block which is equipped with hydraulic components of the slip control system and which is connected by means of brake lines to a master brake cylinder and which is connected by means of brake lines to one or more hydraulic wheel brakes. Hydraulic components are inter alia solenoid valves, hydraulic pumps (normally piston pumps), check valves, hydraulic accumulators, damper chambers and pressure sensors. The hydraulic block is typically a cuboidal metal block which serves for mechanical fastening and hydraulic interconnection of the hydraulic components of the slip control system. Interconnection refers to a hydraulic connection of the hydraulic components in accordance with a hydraulic circuit diagram of the slip control system.

The hydraulic block comprises receptacles for the hydraulic components of the slip control system. These are commonly cylindrical countersinks, blind holes or passage holes, normally of stepped diameter, which are formed in the hydraulic block and into which the hydraulic components are entirely or partially inserted, for example by being pressed in. For example, hydraulic pumps are commonly inserted entirely into their receptacles in a hydraulic block, whereas, in the case of solenoid valves, commonly only a hydraulic part is inserted into a receptacle of a hydraulic block, and an electromagnetic part of the solenoid valve projects out of the hydraulic block. By means of normally Cartesian drilling of the hydraulic block, the receptacles are connected to one another in accordance with the hydraulic circuit diagram of the slip control system. Cartesian means bores formed in the hydraulic block so as to be parallel or at right angles with respect to one another and with respect to surfaces and edges of the hydraulic block. Equipped with the hydraulic components, the hydraulic block forms a hydraulic assembly.

For a connection of the hydraulic block to a master brake cylinder and for the connection of wheel brakes to the hydraulic block, known hydraulic blocks have connection bores for brake lines. The connection bores are typically cylindrical countersinks or blind holes, which have for example internal threads for a screw connection to a screw nipple of a brake line, or which are threadless for the pressing-in and calking of a press-in nipple of a brake line, preferably by way of so-called self-clinch technology. Self-clinch means that the press-in nipple, as it is pressed into the connection bore of the hydraulic block, calks itself in pressure-tight fashion in the connection bore of the hydraulic block with plastic deformation of material of the hydraulic block.

The laid-open specification DE 10 2006 059 924 A1 discloses a hydraulic block for a hydraulic assembly of a slip control system of a hydraulic vehicle brake system, in the case of which all of the receptacles for solenoid valves of the slip control system are arranged in a top side, which can also be referred to as valve side, of a cuboidal hydraulic block. The top side is one of the two large sides of the cuboidal hydraulic block, which is not cubic but rather is longer and wider than it is thick. The top side may be square or rectangular.

Centrally in a longitudinal central plane and offset with respect to a transverse central plane of the hydraulic block, the known hydraulic block comprises an eccentric space in a base side. The base side, which can also be referred to as motor side, is situated opposite the top side and is congruent with respect thereto. The eccentric space is a cylindrical countersink of stepped diameter and is provided for accommodating a pump eccentric which serves for driving two hydraulic pumps. The pump eccentric is driven by an electric motor as pump motor, which is attached on the outside to the motor side of the hydraulic block.

Two receptacles for hydraulic pumps, specifically piston pumps, are arranged opposite one another, radially with respect to the eccentric space, in the known hydraulic block. The two receptacles for the hydraulic pumps are thus arranged in, or open into, longitudinal sides of the hydraulic block. The two piston pumps that form the hydraulic pumps may also be regarded as pump elements.

In the case of the known hydraulic block, four connection bores for brake lines which lead to hydraulic wheel brakes are formed in a transverse side, and two connection bores for brake lines which lead from a two-circuit master brake cylinder are formed in the motor side.

SUMMARY

The hydraulic block according to the disclosure is provided for a hydraulic assembly of a slip control system of a hydraulic vehicle brake system. The hydraulic block has receptacles for valves of the slip control system, in particular solenoid valves, in one of the two mutually opposite large sides of the cuboidal hydraulic block, which are generally referred to as base side and as top side in the case of a cuboid. Here, that large side of the hydraulic block which comprises the receptacles for the valves of the slip control system is also referred to as valve side. Solenoid valves of the slip control system are inlet valves, outlet valves, isolating valves and intake valves. By means of the inlet valves and the outlet valves, wheel brakes are connected to the slip control system. The inlet valves and the outlet valves form wheel brake pressure modulation valve arrangements, by means of which wheel brake pressures in the wheel brakes can be controlled on a wheel-specific basis. By means of the isolating valves, a master brake cylinder can be hydraulically isolated from the vehicle brake system during a slip control operation, and, by means of the intake valves, hydraulic pumps can, for a fast build-up of pressure, be connected directly to the master brake cylinder or to a brake fluid reservoir. Intake valves are not present in every slip control system, but inlet valves, outlet valves and isolating valves are normally provided.

In longitudinal sides, the hydraulic block according to the disclosure comprises receptacles for hydraulic pumps of the slip control system, which are sometimes also referred to as return delivery pumps and are normally piston pumps, sometimes also (internal) gear pumps.

One transverse side of the hydraulic block according to the disclosure is provided for the attachment of an electric motor for driving hydraulic pumps of the slip control system, which hydraulic pumps are arranged in the receptacles for the hydraulic pumps of the hydraulic block. That transverse side of the hydraulic block which is provided for the attachment of the electric motor for driving the hydraulic pumps is in this case also referred to as motor side. It may be shorter than, the same length as or longer than the longitudinal sides of the hydraulic block.

The subclaims relate to advantageous embodiments and refinements of the disclosure.

The disclosure permits an arrangement of all of the solenoid valves of the slip control system on one side of the hydraulic block, specifically, as in the case of known hydraulic blocks of said type, in three rows with four solenoid valves in each case. Also possible is an arrangement of connection bores for hydraulic wheel brakes and a master brake cylinder on those sides and at those points of the hydraulic block where they are also situated in many known hydraulic blocks of said type. The hydraulic block equipped with the components of the slip control system can be accommodated at a conventional position in an engine compartment of a motor vehicle and connected to the conventional brake lines without modifications.

A bore is to be understood to mean a passage hole or a blind hole irrespective of the manner in which it is produced. A bore thus need not be produced by drilling, but rather may be produced for example by milling or in some other way.

BRIEF DESCRIPTION OF THE DRAWINGS

The disclosure will be discussed in more detail below on the basis of two embodiments illustrated in the drawings, in which.

The drawings are a simplified illustration for explanation and understanding of the disclosure.

DETAILED DESCRIPTION

Figure 1:
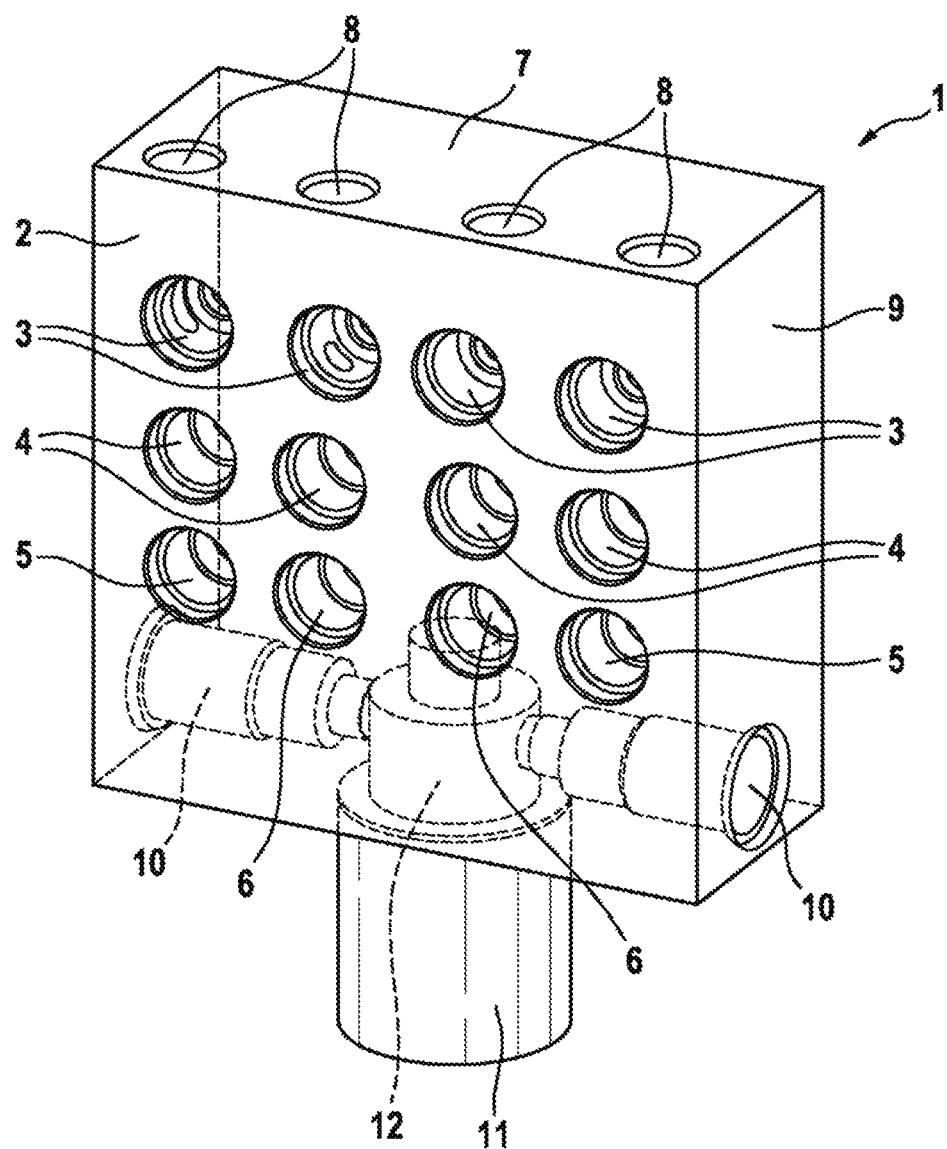
FIG. 1 shows a hydraulic block according to the disclosure in a perspective illustration with a view directed toward one valve side.
Figure 2:
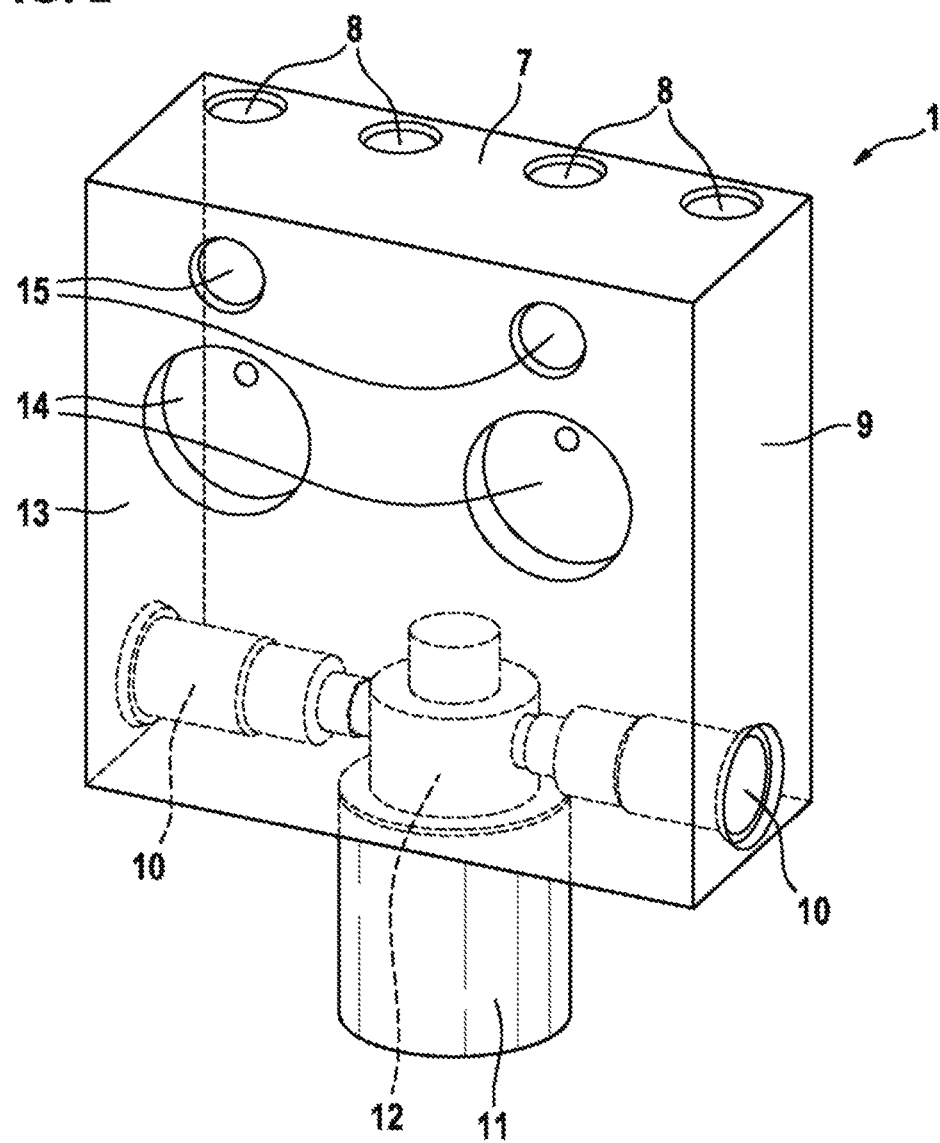
FIG. 2 shows the hydraulic block from FIG. 1 in a perspective illustration with a view directed toward an opposite, accumulator side.

The hydraulic block 1 according to the disclosure illustrated in FIGS. 1 and 2 is provided for a hydraulic assembly of a slip control system of a hydraulic vehicle brake system, which is not otherwise illustrated. Such slip control systems are for example anti-lock, traction control and/or driving dynamics control systems/electronic stability programs, for which the abbreviations ABS, ASR, FDR/ESP are conventional. The hydraulic block 1 is a cuboidal metal block, which, in the terminology used here, is wider and longer than it is thick. It has two mutually opposite large sides, which are square or rectangular and congruent. A large side facing toward a viewer in FIG. 1 is referred to here as valve side 2.

In the valve side 2, the hydraulic block 1 comprises receptacles 3, 4, 5, 6 for solenoid valves (not shown) of the slip control system. For a hydraulic vehicle brake system with two brake circuits and four wheel brakes—two wheel brakes in each brake circuit—the hydraulic block 1 has four receptacles 3 for inlet valves, four receptacles 4 for outlet valves, two receptacles 5 for isolating valves, and two receptacles 6 for intake valves. The four receptacles 3 for the inlet valves are formed in a first row parallel to a transverse side 7 of the hydraulic block 1, the four receptacles 4 for the outlet valves are formed in a second row likewise parallel to the transverse side 7, and the two receptacles 5 for the isolating valves are formed at the outside, and the two receptacles 6 for the intake valves are arranged at the inside, in a third row parallel to the transverse side 7 in the valve side 2 of the hydraulic block 1. In other sides other than the valve side 2, the hydraulic block 1 has no receptacles for solenoid valves of the slip control system. Other numbers and a different arrangement of the receptacles 3, 4, 5, 6 for the solenoid valves in the valve side 2 are possible.

The receptacles 3, 4, 5, 6 for the solenoid valves are cylindrical countersinks of stepped diameter in the hydraulic block 1, into which the solenoid valves (not illustrated) of the slip control system are pressed by way of so-called self-clinch technology. This means that, as they are pressed in, the solenoid valves plastically deform material of the hydraulic block 1 such that said solenoid valves are mechanically held and sealed off in pressure-tight fashion in the receptacles 3, 4, 5, 6.

In that transverse side 7 which is situated closest to the first row with the receptacles 3 for the inlet valves, the hydraulic block 1 has four connection bores 8 for the connection of hydraulic wheel brakes (not shown) of the slip control system. The connection bores 8 for the wheel brakes are arranged in the transverse side 7 in a row parallel to the valve side 2. The connection bores 8 are cylindrical countersinks, for example with internal threads for a screw connection of brake lines with screw nipples or without internal threads for a connection of brake lines by calking. The calking may be performed by means of so-called self-clinch technology using special nipples which, as the nipples are pressed into the connection bores 8, deform material of the hydraulic block 1 such that the nipples are mechanically held and sealed off in pressure-tight fashion in the connection bores 8. The connection bores 8 need not be produced by drilling, but rather may also be produced in some other way, for example by milling.

In longitudinal sides 9, the hydraulic block 1 has two receptacles 10 for piston pumps of the slip control system. The receptacles 10 for the piston pumps are formed coaxially opposite one another in the hydraulic block 1. The longitudinal sides 9 need not be longer than the transverse side 7; in the case of the hydraulic block 1 shown in FIGS. 1 and 2, the longitudinal sides 9 are shorter than the transverse sides 7, and, in FIG. 3, said longitudinal sides are longer. The receptacles 10 for the hydraulic pumps are cylindrical holes of stepped diameter, which are provided for the installation of piston pumps (not illustrated) as hydraulic pumps of the slip control system of the hydraulic vehicle brake system (not illustrated). Typically, piston pumps of said type are pressed into the pump bores of a hydraulic block.

A transverse side of the hydraulic block 1 situated opposite the transverse side 7 with the connection bores 8, which former transverse side is referred to here as motor side and, in the drawing, is situated at the bottom on the hydraulic block 1, is provided for the attachment of an electric motor 11 (indicated by dashed lines) for driving hydraulic pumps arranged in the receptacles 10 for the hydraulic pumps. The receptacles 10 for the hydraulic pumps are arranged in the hydraulic block 1 radially with respect to an axis of the electric motor 11, wherein the electric motor 11 is attached on the outside to the hydraulic block 1. An eccentric space 12 is formed coaxially with respect to the electric motor 11 in the motor side of the hydraulic block 1. The eccentric space 12 serves for accommodating a pump eccentric (not shown) for driving the hydraulic pumps, which pump eccentric can be driven by means of the electric motor 11. The receptacles 10 for the hydraulic pumps, which are indicated in FIGS. 1 and 2 by means of dashed lines, open radially into the eccentric space 12, which is likewise indicated by means of dashed lines in FIGS. 1 and 2.

In a second large side 13, which is situated opposite the valve side 2 and which faces toward the viewer in FIG. 2, the hydraulic block 1 has two cylindrical countersinks as receptacles 14 for hydraulic accumulators. The receptacles 14 for the hydraulic accumulators are arranged approximately in a center between the transverse side 7 and the motor side of the hydraulic block 1, that is to say approximately at the level of the second and the third row with the receptacles 4, 5, 6 for the outlet valves, isolating valves and intake valves, and have a larger diameter than the receptacles 3, 4, 5, 6 for the solenoid valves. In the embodiment of the disclosure that is illustrated and described, the receptacles 14 for the hydraulic accumulators are shallow, and the hydraulic accumulators (not shown) are fastened in pressure-tight fashion to the hydraulic block 1 by calking and project outward from the hydraulic block 1. If sufficient structural space is available in the hydraulic block 1, the hydraulic accumulator (not shown) may also be arranged so as to be partially or entirely recessed in the hydraulic block 1 (not illustrated).

Close to the transverse side 7 with the connection bores for the wheel brakes, the hydraulic block 1 has two connection bores 15 for a two-circuit master brake cylinder (not illustrated) in the large side 13, situated opposite the valve side 2, with the receptacles 14 for the hydraulic accumulators. The connection bores 15 for the master brake cylinder are of the same design as the connection bores 8 for the wheel brakes.

The hydraulic block 1 is Cartesian, that is to say is drilled parallel and at right angles with respect to its edges and sides 2, 7, 9, 13 and mirror-symmetrically with respect to a longitudinal central plane. The longitudinal central plane is situated in a center between, and runs parallel to, the longitudinal sides 9. Mirror-symmetrically with respect to the longitudinal central plane means that the receptacles 3, 4, 5, 6, 10, 14 for the hydraulic components of the slip control system are formed in the hydraulic block 1 mirror-symmetrically with respect to the longitudinal central plane. The axis of the eccentric space 12 and of the electric motor 11 is situated in the longitudinal central plane. Individual deviations from the symmetry are not ruled out.

Equipped with the solenoid valves, hydraulic pumps and further hydraulic components (not illustrated) of a slip control system of a hydraulic vehicle brake system (not illustrated), the hydraulic block 1 forms a hydraulic assembly, which forms the core part of a hydraulic part of the slip control system.

Figure 3:
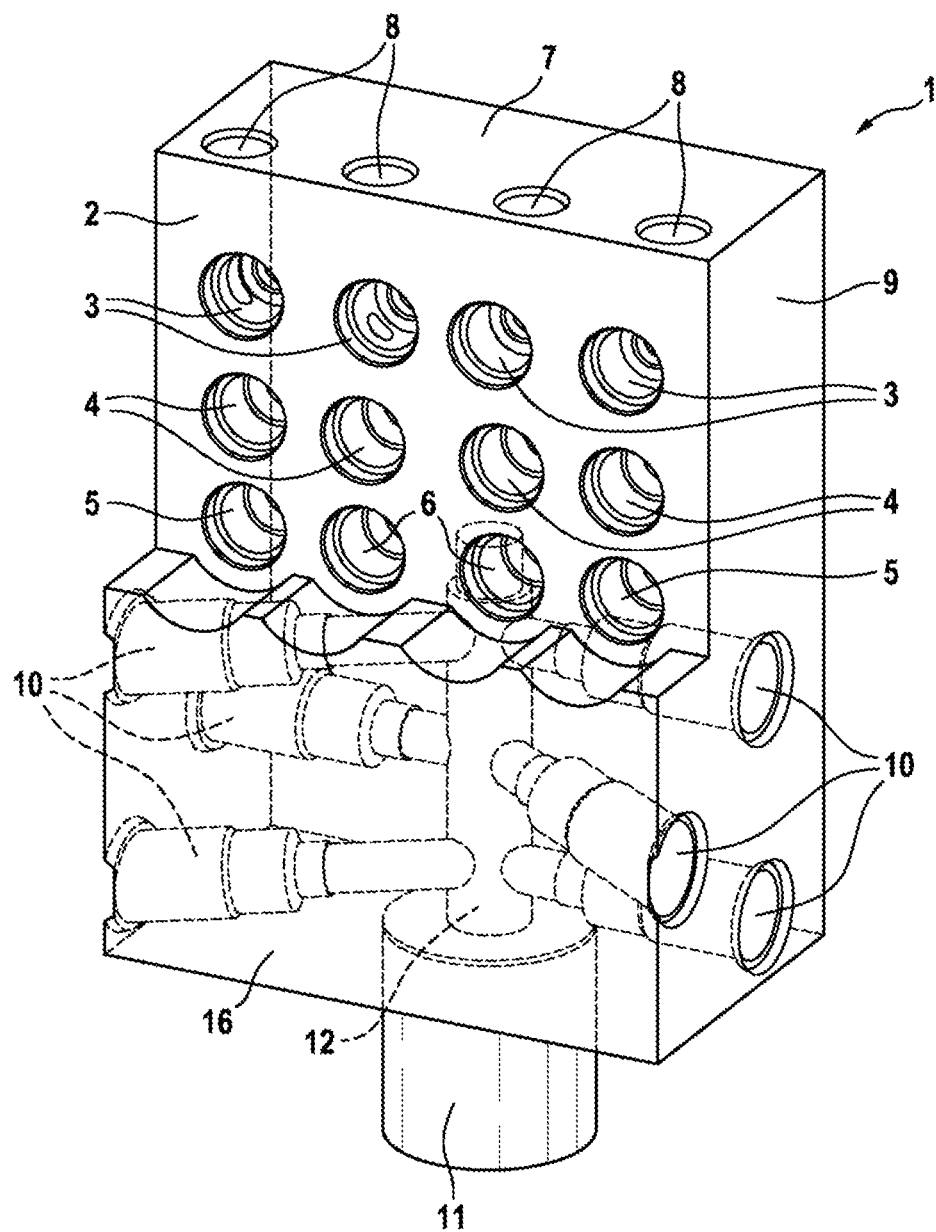
FIG. 3 shows a second embodiment of a hydraulic block according to the disclosure with a viewing direction corresponding to FIG. 2.

By contrast to the hydraulic block 1 shown in FIGS. 1 and 2, the hydraulic block 1 in FIG. 3 has not two—one for each brake circuit—but rather six receptacles 10 for hydraulic pumps, specifically three receptacles 10 for hydraulic pumps for each of two brake circuits. The viewing direction in FIG. 3 is the same as in FIG. 1, that is to say the valve side 2 can be seen. Owing to the additional four receptacles for hydraulic pumps 10, the hydraulic block 1 from FIG. 3 is longer than the hydraulic block 1 from FIGS. 1 and 2. In addition to the two receptacles 10 for hydraulic pumps that the hydraulic block 1 from FIGS. 1 and 2 comprises, the hydraulic block 1 from FIG. 3 comprises a further receptacle 10 for a hydraulic pump in a longitudinal side 9, and a receptacle 10 for a hydraulic pump in an opposite longitudinal side. Axes of these three receptacles 10 for hydraulic pumps are all situated in an axial plane of the electric motor 11 and of the eccentric space 12 which is parallel to the valve side 2 of the hydraulic block 1, wherein the axis of the one receptacle 10 for a hydraulic pump on the opposite longitudinal side is situated in a center between the axes of the two receptacles 10 for hydraulic pumps on the one longitudinal side 9 of the hydraulic block 1.

The further three of the total of six receptacles 10 for hydraulic pumps are formed in the hydraulic block 1 so as to be offset obliquely at acute angles toward the same side, specifically in the direction of the valve side 2 of the hydraulic block 1. The axes of all six receptacles for hydraulic pumps run radially with respect to the axis of the electric motor 11 and of the eccentric space 12. As viewed perpendicularly with respect to the valve side 2, one of the receptacles 10 for hydraulic pumps formed obliquely in the hydraulic block 1 is situated in a center between the two receptacles 10 for hydraulic pumps on the one longitudinal side 9 of the hydraulic block 1. On the opposite longitudinal side, the two receptacles 10 for hydraulic pumps formed obliquely in the hydraulic block 1 are situated, as viewed perpendicularly with respect to the valve side 2, to both sides of the one receptacle 10 for a hydraulic pump and in the same radial planes, with respect to the axis of the electric motor 11 and of the eccentric space 12, as the two receptacles 10 for hydraulic pumps on the one longitudinal side 9 of the hydraulic block 1. For the accommodation of the three receptacles 10 for hydraulic pumps formed obliquely in the hydraulic block 1, the hydraulic block 1 has a step-like elevation 16 on the valve side 2, which may be formed as an integral constituent part of the hydraulic block 1 or may be attached as an originally separate part to the valve side 2. The hydraulic block 1 is relatively thick in the region of the receptacles 10 for the hydraulic pumps.

All of the other receptacles 3, 4, 5, 6, 14 for the solenoid valves and the hydraulic accumulators of the slip control system, the connection bores 8, 15 and the eccentric space 12 are arranged in the same way in the hydraulic block 1 from FIG. 3 as in FIGS. 1 and 2. Identical elements are denoted by the same reference designations in all of the figures.

The invention claimed is:

1. A cuboidal hydraulic block for a hydraulic assembly of a slip control system of a hydraulic vehicle brake system, comprising:
   a first large side;
   two opposing longitudinal sides adjacent to the first large side;
   two opposing transverse sides adjacent to the two longitudinal sides, at least one of the two transverse sides being adjacent to the first large side;
   a plurality of first receptacles defined in the first large side of the hydraulic block, the plurality of first receptacles configured for valves of the slip control system, the plurality of first receptacles including:
      four inlet valve receptacles configured to receive inlet valves and arranged in a first row parallel to the two transverse sides;

four outlet valve receptacles configured to receive outlet valves and arranged in a second row parallel to the two transverse sides; and two intake valve receptacles configured to receive intake valves and two isolating valve receptacles configured to receive isolating valves, the two intake valves and two isolating valves arranged in a third row parallel to the two transverse sides; and at least one second receptacle disposed in at least one of the two longitudinal sides of the hydraulic block, each second receptacle of the at least one second receptacle configured for a hydraulic pump of the slip control system, wherein a first transverse side of the two transverse sides of the hydraulic block is configured as a motor side for the attachment of an electric motor, the electric motor configured to drive the hydraulic pump arranged in each second receptacle.

2. The hydraulic block as claimed in claim 1, further comprising an eccentric space defined in the motor side and configured for a pump eccentric, the pump eccentric configured to drive the hydraulic pump arranged in each second receptacle.

3. The hydraulic block as claimed in claim 1, further comprising at least one third receptacle disposed in a second large side situated opposite the first large side.

4. The hydraulic block as claimed in claim 1, further comprising:

a first connection bore disposed in a second transverse side situated opposite the motor side, the first connection bore configured to hydraulically connect to a hydraulic wheel brake; and a second connection bore disposed in a second large side situated opposite the first large side, the second connection bore configured to hydraulically connect to a master brake cylinder.

5. The hydraulic block as claimed in claim 1, wherein all receptacles configured for solenoid valves of the slip control system are disposed in the first large side.

6. The hydraulic block as claimed in claim 1, wherein the at least one second receptacle includes a plurality of second receptacles, each second receptacle of the plurality of second receptacles configured to receive one of the hydraulic pumps of the slip control system.

7. The hydraulic block as claimed in claim 6, wherein the hydraulic block has a thickness defined perpendicular to the first large side, the thickness being greater in a region of the one or more oblique second receptacles.

8. The hydraulic block as claimed in claim 6, wherein one or more oblique second receptacles of the plurality of second receptacles are oblique with respect to the first longitudinal side, the two longitudinal sides, and the two transverse sides of the hydraulic block.

* * * * *

UNITED STATES PATENT AND TRADEMARK OFFICE
CERTIFICATE OF CORRECTION

PATENT NO. : 11,565,678 B2
APPLICATION NO. : 16/490383
DATED : January 31, 2023
INVENTOR(S) : Zander et al.

It is certified that error appears in the above-identified patent and that said Letters Patent is hereby corrected as shown below:

In the Claims

At Column 8, Lines 18-21, Claim 7 should be deleted and replaced with the following:
-- 7. The hydraulic block as claimed in claim 6, wherein one or more oblique second receptacles of the plurality of second receptacles are oblique with respect to the first longitudinal side, the two longitudinal sides, and the two transverse sides of the hydraulic block. --

At Column 8, Lines 22-26, Claim 8 should be deleted and replaced with the following:
-- 8. The hydraulic block as claimed in claim 7, wherein the hydraulic block has a thickness defined perpendicular to the first large side, the thickness being greater in a region of the one or more oblique second receptacles. --

Signed and Sealed this
Thirtieth Day of May, 2023

Katherine Kelly Vidal
*Director of the United States Patent and Trademark Office*